(12) United States Patent
Hicks et al.

(10) Patent No.: US 11,511,658 B2
(45) Date of Patent: Nov. 29, 2022

(54) OUTDOOR KITCHEN ACCESSORY FOR RECREATIONAL VEHICLES

(71) Applicant: Steiner Enterprises, Lafayette, IN (US)

(72) Inventors: Thomas P. Hicks, Lafayette, IN (US); Donald E. DeWitt, Syracuse, IN (US); Joshua E. DeWitt, Westfield, IN (US)

(73) Assignee: Steiner Enterprises, Lafayette, IN (US)

( * ) Notice: Subject to any disclaimer, the term of this patent is extended or adjusted under 35 U.S.C. 154(b) by 26 days.

(21) Appl. No.: 17/319,753

(22) Filed: May 13, 2021

(65) Prior Publication Data

US 2021/0362639 A1 Nov. 25, 2021

Related U.S. Application Data

(60) Provisional application No. 63/028,662, filed on May 22, 2020.

(51) Int. Cl.
*B60P 3/36* (2006.01)
*B60P 3/34* (2006.01)

(52) U.S. Cl.
CPC .. *B60P 3/34* (2013.01); *B60P 3/36* (2013.01)

(58) Field of Classification Search
CPC ................................. B60P 3/34; B60P 3/36
See application file for complete search history.

(56) References Cited

U.S. PATENT DOCUMENTS

| 5,586,546 A * | 12/1996 | Ashcraft | B60P 3/36 126/42 |
| 6,263,867 B1 * | 7/2001 | Skelton | B60R 9/02 248/240.1 |
| 7,281,646 B2 * | 10/2007 | Flannery | B60R 9/06 224/512 |

FOREIGN PATENT DOCUMENTS

WO    WO-2019244053 A1 * 12/2019 ............ B60N 3/001

* cited by examiner

*Primary Examiner* — Joseph D. Pape
(74) *Attorney, Agent, or Firm* — Maginot, Moore & Beck LLP

(57) ABSTRACT

A kitchen accessory for a recreational vehicle includes a box configured to be mounted within a side wall of the recreational vehicle. A vertical support post is anchored within said box and a drop-down support assembly is rotationally mounted on the vertical support post. The drop-down support assembly includes a plate on which a cooking component is mounted. The cooking component includes a stove and an optional table extension. The drop-down support assembly is configured to extend the cooking component from the box to a deployed position for use outside the vehicle, and to retract the cooking component completely into the box in a stowed position for storage within the box. An additional table assembly can be pivotably mounted to the box for storage within and extension outside the box. An auxiliary support component can be mounted on the vertical support post to support an auxiliary device, such as a television.

15 Claims, 8 Drawing Sheets

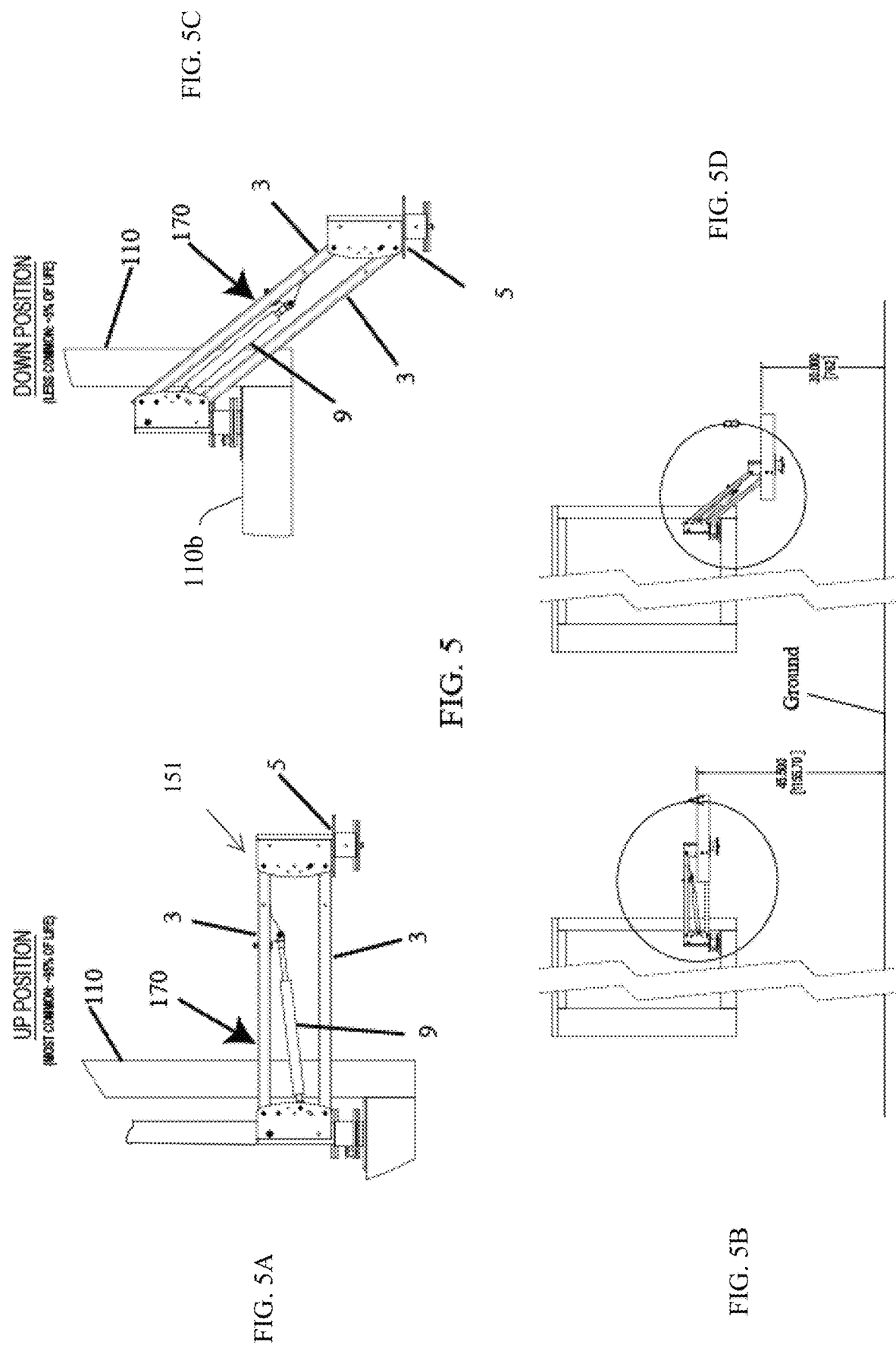

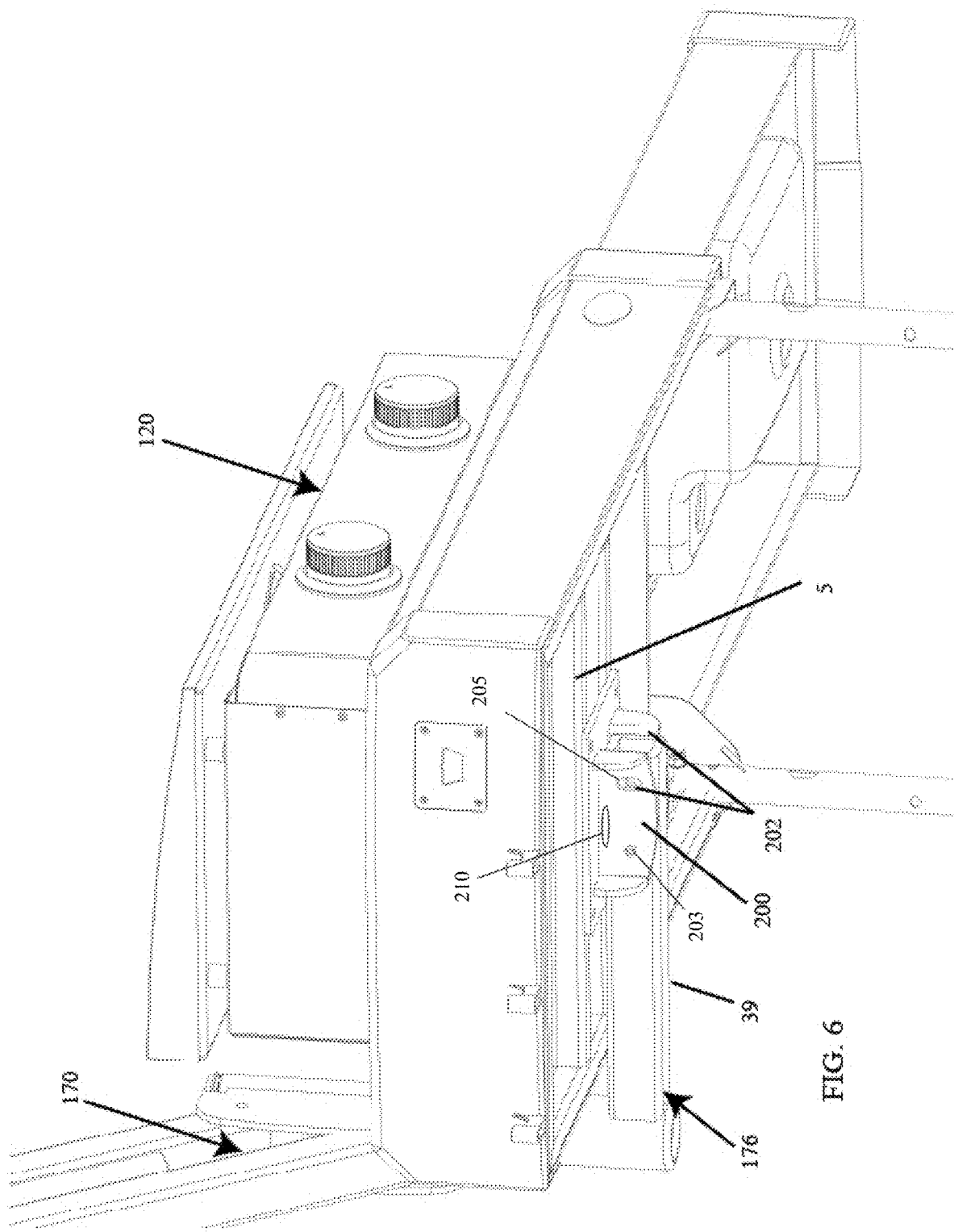

OUTDOOR KITCHEN ACCESSORY FOR RECREATIONAL VEHICLES

PRIORITY CLAIM

This application is a utility filing from and claims priority to U.S. Provisional Application No. 63/028,662, filed on May 22, 2020, the entire disclosure of which is incorporated herein by reference.

BACKGROUND

Many recreational vehicles (RVs) have cooking appliances inside the vehicle. However, the interior space limitations inherent with RVs make cooking problematic or, at best, awkward at best. Moreover, the smoke and odors accompanying some cooking can permeate the "indoor" environment of the RV. Spills, splatters and even smoke from cooking can soil the indoor surfaces, including the living areas of the RV. "Indoor" cooking in an RV can overwhelm the occupants. Moreover, "indoor" cooking does not take advantage of one of the great benefits of RV travel—enjoying the "great outdoors".

Many RVers avoid the problems with indoor cooking appliances by relying on portable outdoor grills, ranging from the well-known Smoky Joe, to the George Foreman grill, to even larger outdoor grills. However, in every case, the outdoor grill must be stowed when not in use and retrieved for use, which can be inconvenient and cumbersome. Moreover, storing the grill takes up precious storage space in the RV, or requires significant hardware to carry on the rear of the RV. There is a need for a kitchen accessory for a recreational vehicle that permits outdoor cooking but is simple to access and use.

SUMMARY OF THE DISCLOSURE

A kitchen accessory for a recreational vehicle includes a box configured to be mounted within a side wall of the recreational vehicle. A vertical support post is anchored within said box and a drop-down support assembly is rotationally mounted on the vertical support post. The drop-down support assembly includes a plate on which a cooking component is mounted. The cooking component includes a stove and an optional table extension. The drop-down support assembly is configured to extend the cooking component from the box to a deployed position for use outside the vehicle, and to retract the cooking component completely into the box in a stowed position for storage within the box. The drop-down support assembly includes articulating components that allow the cooking component to be rotated into and out of the box, and that allow the height of the cooking component to be adjusted in the deployed position. A gas spring in the drop-down support works to hold the vertical position of the cooking component.

An additional table assembly can be pivotably mounted to the box for storage within and extension outside the box. An auxiliary support component can be mounted on the vertical support post to support an auxiliary device, such as a television.

DESCRIPTION OF THE DRAWINGS

FIGS. 5A, 5B are side views of the drop-down support assembly in an "up" position.

FIGS. 5C, 5D are side views of the drop-down support assembly in an "down" position.

FIG. 6 is a perspective view of the kitchen accessory shown in FIG. 1 incorporating a leveling mechanism.

DETAILED DESCRIPTION

Figure 1:
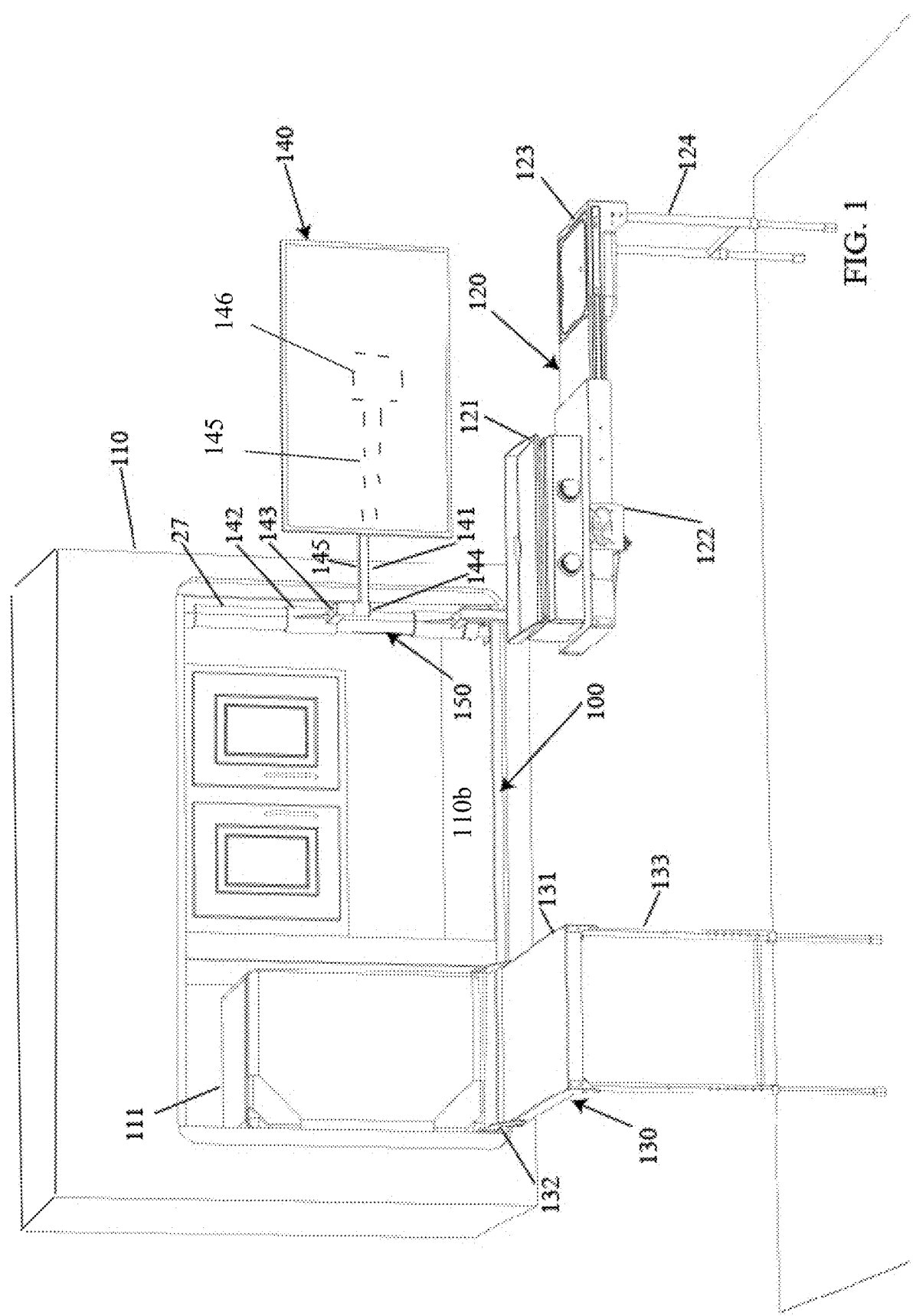
FIG. 1 is a perspective view of an outdoor kitchen accessory for a recreational vehicle according to one embodiment of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

An outdoor kitchen accessory 100 as shown in FIG. 1 is contained in a box 110 that is configured to be mounted or formed within a side wall of a recreational vehicle for access outside the vehicle. The box 110 includes a door (not shown) that is hinged to the box to close the recess 111 defined by the box. The door can include a lock for security of the components stowed within the box. The box 110 is preferably configured to be mounted in a side wall of the vehicle, either as a factory-installed accessory or as a retrofitted accessory. Appropriate brackets, support trusses and fasteners can be employed to fasten the accessory 100 to the RV body.

Figure 4:
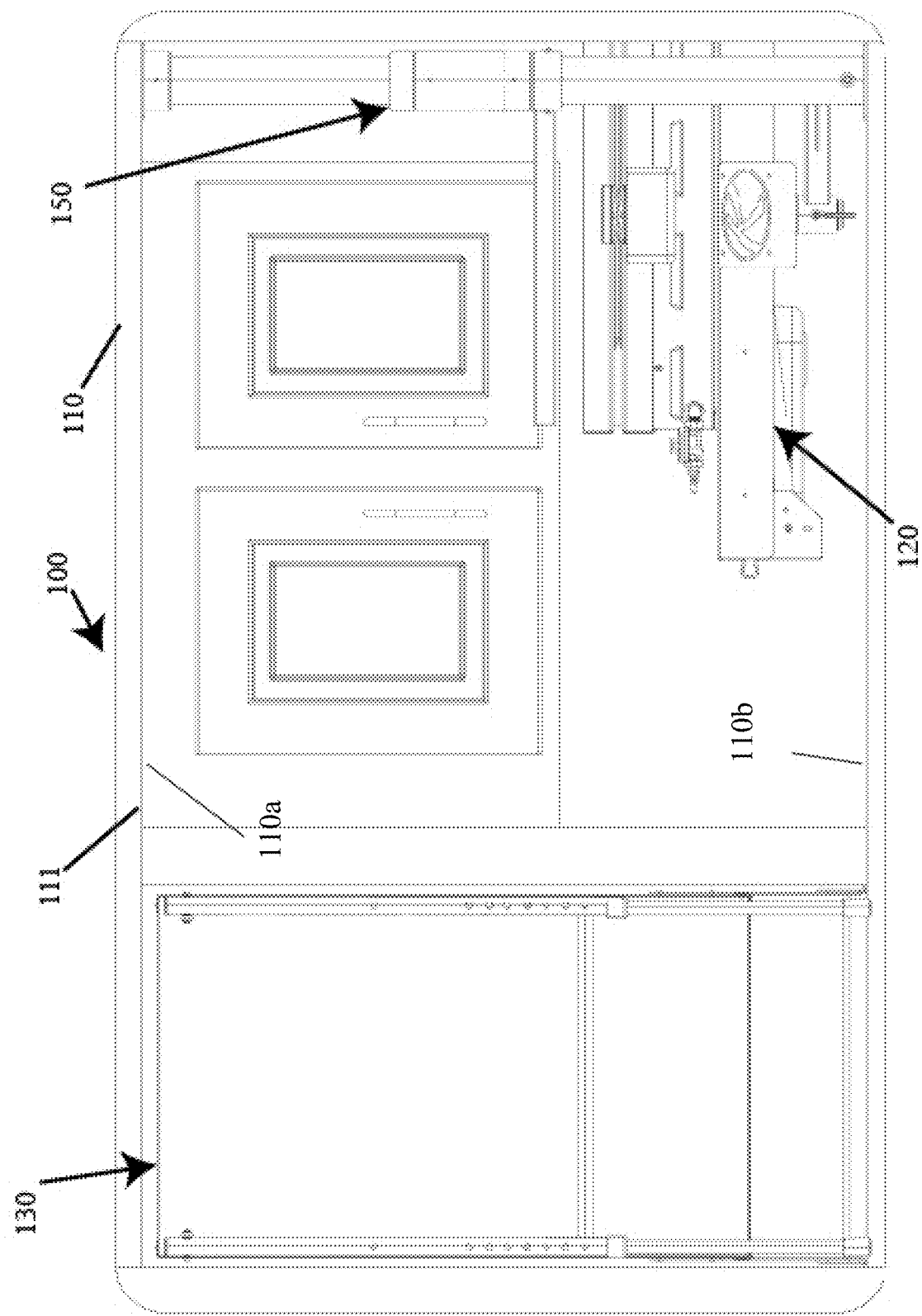
FIG. 4 is a front view of the outdoor kitchen accessory shown in FIG. 1, depicted with the accessory in its stowed condition.

In one aspect, the accessory 100 includes a cooking component 120, a table component 130, and an optional accessory 140, which in the illustrated embodiment can be a television. All of the components are configured to be movable from the in-use configuration shown in FIG. 1 to the stowed configuration shown in FIG. 4. In the stowed configuration, the door (not shown) can be closed over the recess 111 to enclose the stowed components.

The table component 130 includes a table top 131 that is fastened to the box 110 by a hinge assembly 132 so that the table top can be pivoted from the vertical stowed position (FIG. 4) to the horizontal in-use configuration (FIG. 1). The table top is provided with a folding leg assembly 133 that is pivotably mounted to the table top to fold underneath the table top for storage. It can be appreciated that the table top 131 is stably supported by the RV and the leg assembly.

The cooking component 120 includes a portable stove 121 supported on a base 122. The portable stove can be a variety of types of stoves, including electric and gas. The base 122 includes the controls for the portable stove 121 and the electrical or gas interface needed to provide power to the stove. The cooking component 120 can optionally include a telescoping table extension 123 that is mounted to the base 122 so that the table extension can be slid underneath the base for storage (FIG. 4) or extended outward for use (FIG. 1). A folding leg assembly 124 supports the cantilevered end of the table extension 123. It is noted that in the preferred embodiment of the cooking accessory 100, the folding leg assembly 124 is not required to support the cooking component 120, which can be supported by a drop-down support assembly 150 mounted on a vertical support post component 160 anchored within the box 110, as described below. However, in an alternative embodiment, the folding leg assembly 124 can be added to the base 122 to provide additional stability for the cooling component 120 supported by the drop-down support assembly.

Figure 2:
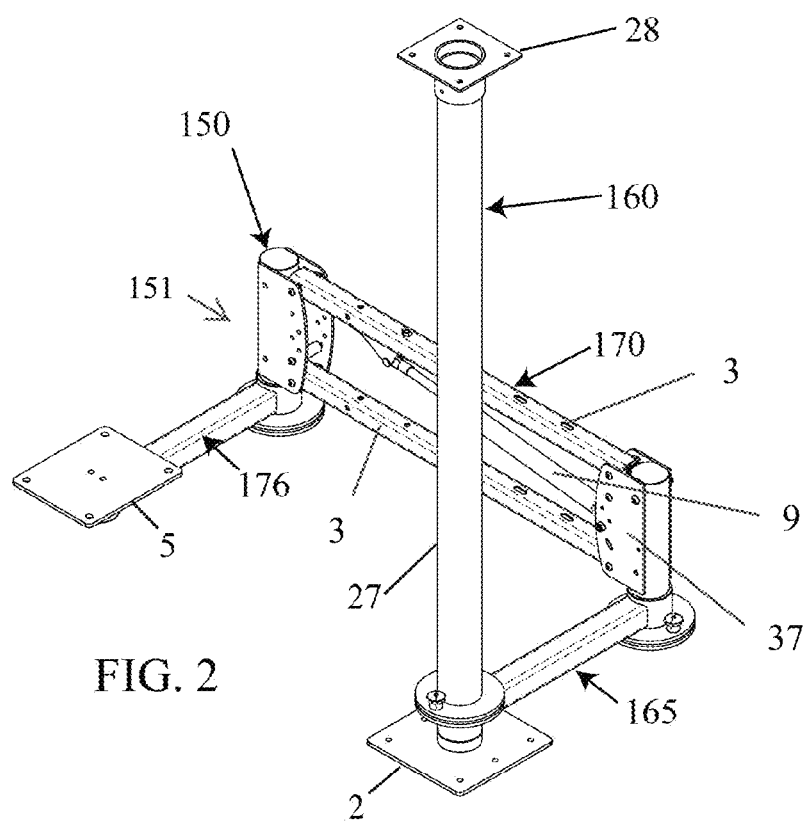
FIG. 2 is a perspective view of a drop-down support assembly for the outdoor kitchen accessory shown in FIG. 1.

As shown in FIG. 2, the drop-down support assembly 150 is configured to extend the cooking component from the box for use outside the vehicle, and to retract the cooking component completely into the box for storage. The assembly 150 includes an articulating mechanism 151 that allow the cooking component to be extended outward from the box 100 and assume a generally horizontal position of the cooking component outside the vehicle. Thus, in one embodiment, the drop-down support assembly includes a first elbow joint component 165 rotatably supported by the post component, a vertical adjustment component 170 rotatably and pivotably supported by the first elbow joint component, a second elbow joint component 176 rotatably supported by the adjustment component 170. The second elbow joint assembly 176 supports a cantilevered mounting plate 5 on which the cooking component 120 is mounted. In particular, the base 122 of the cooking component can be fastened by bolts extending through the bolt pattern in the plate 5. The plate 5 is thus sized as needed to provide a suitable platform for the cooking component 120, particularly the base 122.

Figure 3:
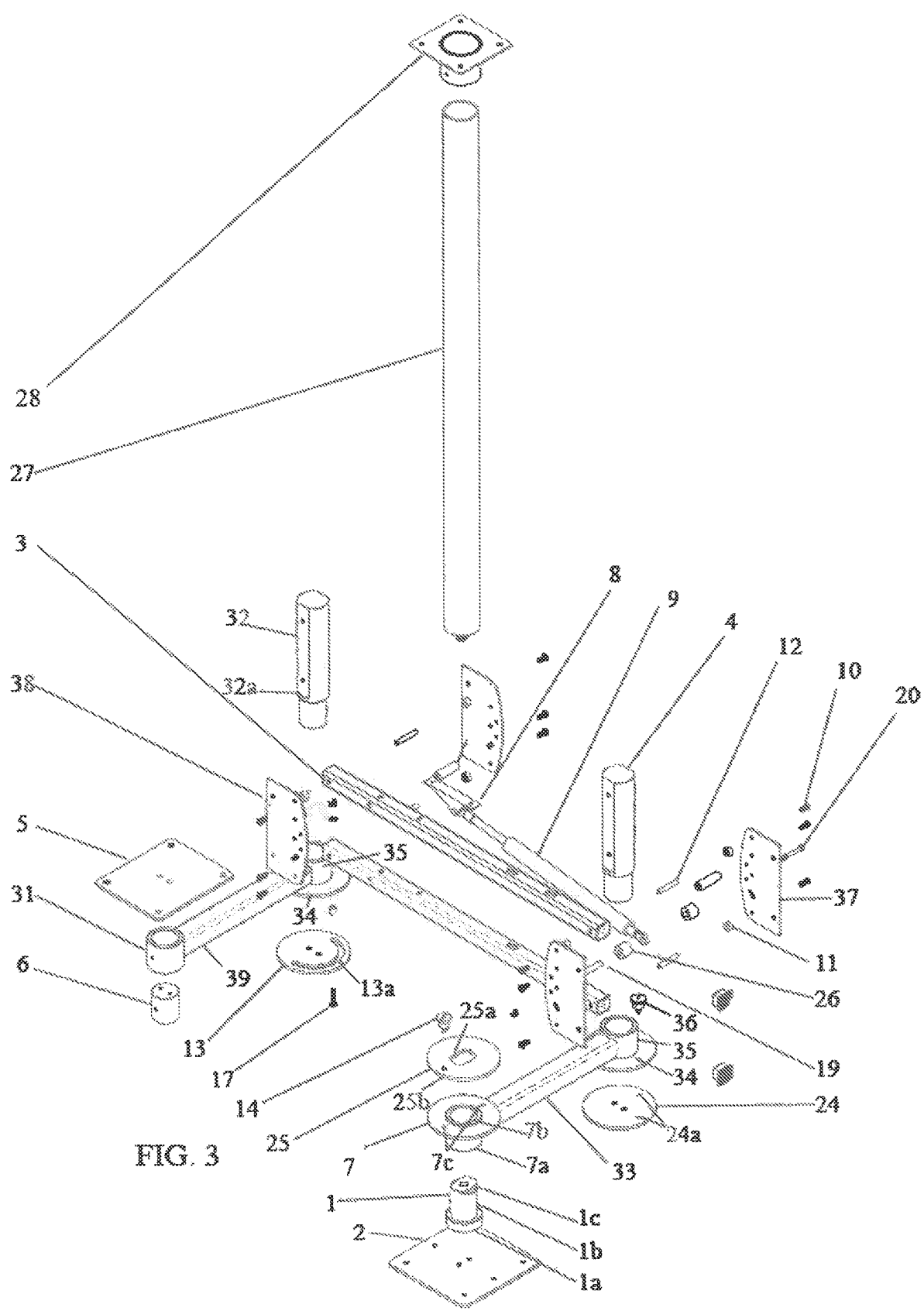
FIG. 3 is an exploded view of the drop-down support assembly shown in FIG. 2.

Details of the components of the drop-down support assembly 150, including the articulating mechanism 151, and the support post component 160 are shown in the exploded view of FIG. 3. The support post component 160 include a base plate 2 with an elbow joint support 1 projecting therefrom. The support 1 includes a circular shoulder 1*a* leading to a cylindrical body 1*b* and terminating in an end portion 1*c* that includes at least one flat, non-circular surface. The cylindrical body extends through a cylindrical bore 7*b* defined in a pivot mounting plate 7 at one end of the first elbow joint assembly 165. The mounting plate 7 further includes a collar 7*a* that defines the bore 7*b* and is seated on the shoulder 1*a* of the elbow joint support 1. A locking plate 25 is mounted on the mounting plate 7 and is held against rotation by the at least one flat on the end portion 1*c* of the joint support 1 and a complementary configured opening 25*a* in the locking plate. The locking plate 25 carries an indexing plunger 14 that extends through an opening 25*b* in the locking plate to engage two or more indexing holes 7*c* in the mounting plate 7. It can be appreciated that the cylindrical engagement between the collar 7*a* and the cylindrical body 1*b* of the joint support 1 allows the first elbow joint component 165 to rotate about the joint support 1. The interface between the plunger 14 and the indexing holes 7*c* operates as an indexing mechanism that holds the joint component 165 at a particular angular position, which position depends on whether the cooking accessory is stowed or in use. In one embodiment, two indexing holes 7*c* are oriented 180° apart, with one indexing hole corresponding to an angular position of the mounting plate 7 in which the cooking component is inside the box, and the opposite indexing hole corresponding to an angular position of the mounting plate in which the cooking component is outside the box.

The bottom end of a vertical pole 27 is fastened to the top of the end portion 1*c*, such as by a threaded engagement. The opposite end of the vertical pole is mated with a support receptacle 28 that is fastened to the box 110 of the RV insert 100. The base plate 2 is also fastened to the insert box 110, as shown in FIG. 1. The vertical pole 27 thus serves as an anchor for the support assembly 150. In particular, the vertical pole is fixed between the top wall 110*a* and bottom wall 110*b* of the box 110.

The first elbow joint component 165 includes an arm 33 affixed to the mounting plate 7 and particularly affixed to the collar 7*a*. The opposite end of the arm 33 terminates in a pivot mounting plate 34 that includes a cylindrical collar 35 similar to the collar 7*a*. A hinge pin 4 extends through the collar 35 and is fastened to a locking plate 24. The pivot mounting plate 34 further includes an indexing plunger 36 that extends through the mounting plate 34 to engage two or more holes 24*a* in the locking plate 24. The plunger 36 and holes 24*a* operate in the same way as the plunger 14 and holes 7*c* to hold the hinge pin 4 at a particular angular orientation relative to the arm 33, depending on whether the cooking appliance is in use or stowed.

The vertical adjustment component 170 mates with the first elbow joint component 165 by way of the hinge pin 4. In particular, the hinge pin 4 is fastened to a pair of opposite bracket plates 37. The bracket plates 37 are connected to one end of the two drop-down arms 3 and to one end of the gas spring 9. Spacers 11 are provided between the drop-down arms 3 and the bracket plates 37 with bolts 10 provided to fasten the arms to the plates. A bolt 20 passes through opposite spacers 26 and through a collar at the end of the gas spring to pivotably fasten the gas spring to the bracket plates at the first elbow joint component. Spacers 12, 19 can be provided between the two plates 37 to strengthen the assembly. As shown in FIG. 2, the two drop-down arms 3 are mounted parallel to each other, while the gas spring 9 is mounted between the bracket plates 37 and the upper arm 3. In particular, an end bracket 8 fastens the end of the gas spring fastens to the upper arm. The ends of the two drop-down arms and of the gas spring are pivotably fastened to the bracket plates 37.

The opposite ends of the drop-down arms 3 are pivotably mounted to another pair of bracket plates 38. It can be appreciated that the two bracket plates 37, 38 and two arms 3 are connected so that the arms can pivot upward and downward relative to the support post while maintaining the bracket plates 38 in the same vertical orientation. This feature ensures that cooking component 120 remains horizontal even as the vertical position of the component Is changed. The bracket plates 38 connect the end of the vertical adjustment component 170 to the second elbow joint component 175. The second elbow joint component 170 is similar to the first elbow joint component in that it permits rotation of an arm 39 relative to the vertical adjustment component. The pivot interface at the bracket plates 38 can be the same as the pivot interface between the first elbow joint component and the adjustment component. However, in one embodiment, the pivot interface permits continuous movement through an angular range rather than limiting the interface to discrete angular positions as with the other two pivot interfaces. The arm 39 includes a pivot mounting plate 34 and collar 35, with the collar configured to receive a hinge pin 32. The hinge pin 32 is fastened to the bracket plates 38 to connect the second elbow joint component 175 to the vertical adjustment component 170. A locking plate 13 is fastened to the end of the hinge pin 32 so that the mounting plate 34 and collar 35 are held between the locking plate and a shoulder 32a on the hinge pin. The mounting plate 34, and thus the arm 39, are free to pivot about the hinge pin 32. However, the degree of angular motion is limited by an angular limit mechanism that includes a slot 13a in the locking plate 13 and a spacer 13 disposed within the slot but fastened to the underside of the locking plate by a bolt 17. The spacer is free to travel within the slot 13a as the arm 39 rotates, but is limited by contact with the ends of the slot. In one embodiment the slot permits 180° pivoting of the arm 39 relative to the vertical adjustment member 170.

The end of the arm 39 terminates in a support collar 31 that receives cylindrical plug 6. The plug 6 is fastened to the underside of the cantilevered mounting plate 5. The plug 6 can be locked to the collar 31 or can be permitted to rotate relative to the collar. The cooking component 120 is mounted to the plate 5, as described above, so that the cooking component can be fixed to the arm 39 of the second elbow joint component 175, or permitted to rotate about the collar.

It can be appreciated that the two elbow joint components 165, 175 allow the drop-down support assembly 150 to fully articulate along multiple pivot axes. This articulation feature allows the cooking component 120 to be moved from the stowed configuration shown in FIG. 4 to the in-use or extended configuration shown in FIG. 1. It can be further appreciated that the vertical adjustment component 170 allows the cooking component 120 to be raised and lowered relative to the RV, as illustrated in FIGS. 5A-5B. In the "up" position, the drop-down arms 3 are horizontal relative to the ground, as shown in FIG. 5A, 5B. More importantly, the arms and thus the mounting plate 5 (and the cooking component 120 mounted thereon) are aligned so that the support assembly 150 can be pivoted relative to the vertical pole 27 to move the cooking component into and out of the RV insert 100. When the support assembly has been manipulated so that the vertical adjustment component 170 is outside the box 110, the drop-down arms 3 can be pushed downward against the force of the gas spring 9 to the position shown in FIG. 5C, 5D. The gas spring 9 can be configured to hold the adjustment component in any vertical position desired by the user. It can be noted in FIGS. 5C, 5D that the drop-down support assembly 150, and particularly the vertical adjustment component 170, is configured so that the plate 5, and thus the cooking component 120, can be positioned vertically below the bottom wall 110b of the box 110. This feature allows the box to be mounted within the recreational vehicle at a side range of positions and still be able to deploy the cooking component at a comfortable height for the user.

The optional accessory 140 can be supported on the vertical pole 27 by a support arm assembly 141. The support arm assembly 141 can include a collar assembly 142 that can be at a fixed position on the vertical pole 27 or can be slidable up and down the vertical pole. The collar assembly 142 is configured to rotate about the vertical pole so that a first arm 143 attached to the assembly can be pivoted from the stowed position inside the box 110 to a deployed position outside the box. A second arm 145 is connected to the first arm 143 by a pivot mount 144, and the accessory 140 is mounted to the second arm 145. The combination of the first and second arms 143, 145 and pivot connections 142, 144 allow the accessory 140 to be stowed and deployed as desired by the RV user. The accessory 140 can be mounted to the end of the second arm 145 by a fixed or gimbaled mount 146. In the illustrated embodiment, the accessory 140 is a television that can be oriented where the person cooking on the cooking component 120 can watch. Alternatively, the accessory can be a tablet or smart phone, in which case the second arm 145 can include a suitable clamp as known in the art for gripping and supporting the tablet or smart phone.

Figure 6A:
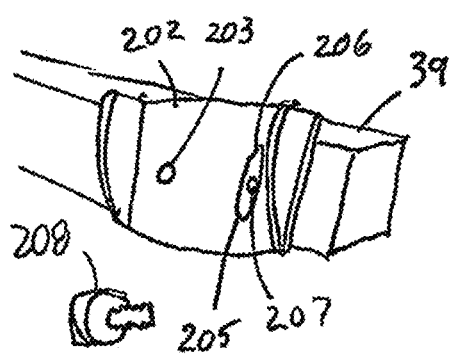
FIG. 6A is an enlarged view of the leveling mechanism shown in FIG. 6.

The support assembly can include a leveling feature that allows the user to level the cooking component 120. Thus, as shown in FIG. 6, the interface between the second elbow joint assembly 176 and the cantilevered mounting plate 5 includes an angular adjustment or leveling mechanism 200. The outermost plate can include a bubble level 210 that can allow the user to accurately adjust the angle of the cooking component 120 to make it as level as possible. The mechanism can include a pair of plates 202 pivotably fastened at pivot mount 203 on opposite sides of the arm 39 elbow joint assembly to permit pivoting of the plates relative to the arm. The plates 202 are affixed to the mounting plate 5 so that the mounting plate, and the components supported by the mounting plate, pivot with the plates 202. The mechanism can incorporate a detent arrangement, a stop arrangement or other feature 205 that allows the plates to be fixed at a particular angular orientation relative to the arm 39. Thus, as shown in FIG. 6A, one embodiment of the mechanism 205 can include an arcuate slot 206 defined in one or both plates 202. The slot is aligned with a threaded bore 207 defined in the arm 39. A knob 208 can be threaded into the bore and tightened against the plate 202 to fix the leveling mechanism 200, and thus the cooking component 120, at the desired angle relative to the arm. The knob and plate can incorporate a surface feature to enhance the frictional engagement between the knob and the plate.

In the illustrated embodiment, the pole 27 is arranged vertically within the box 110 of the RV insert 100. Alternatively, the pole can be arranged horizontally across the top or bottom of the box 110. The drop-down support assembly 150 can be configured and operable as described above. The cooking component 120 in the illustrated embodiment is a stove, but can be other appliances or utensils. For instance, the stove 121 can be replaced by a sink or another table.

Figure 7:
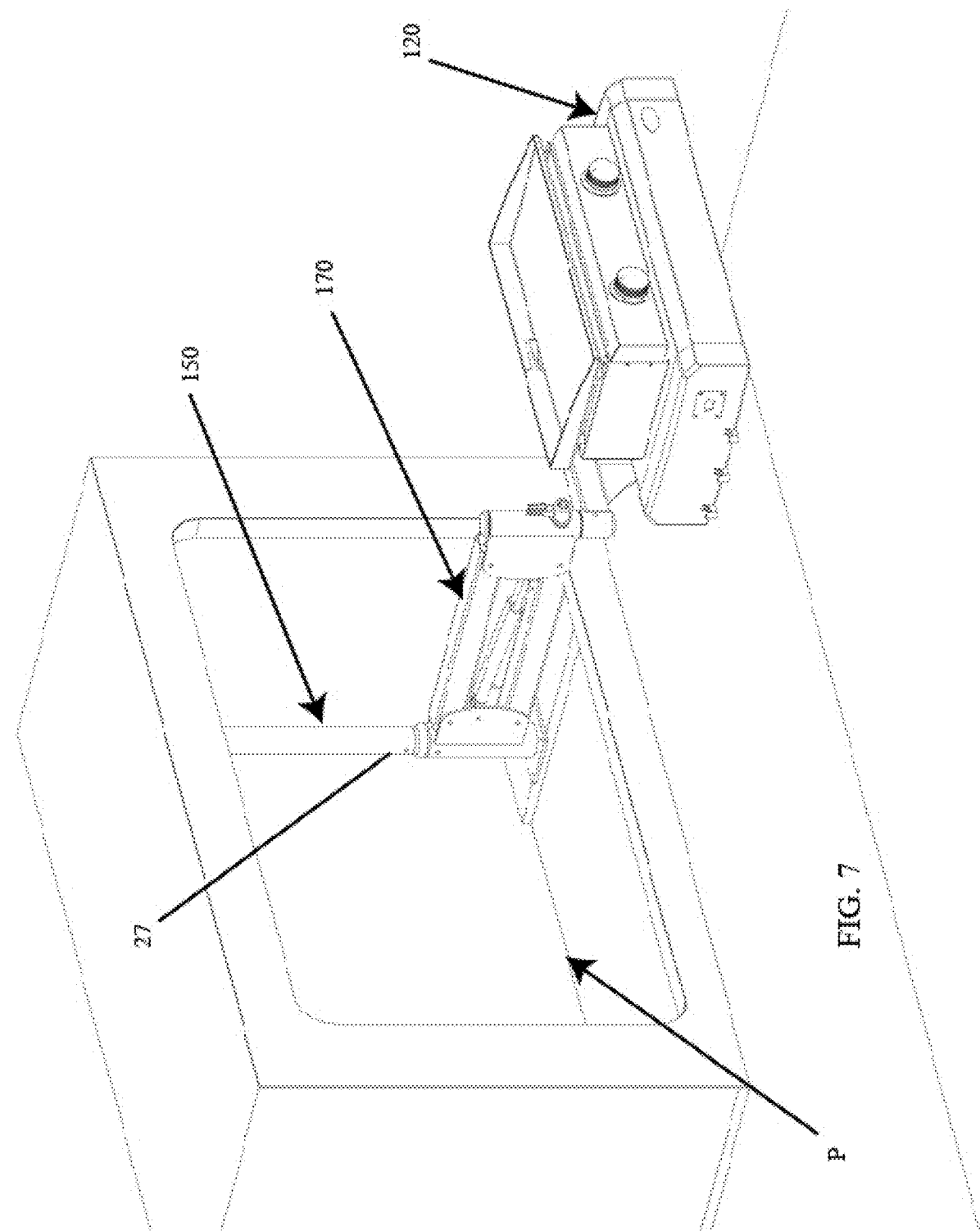
FIG. 7 is a perspective view of the outdoor kitchen accessory of the present disclosure mounted within a pass-through opening of a recreational vehicle.

It can be appreciated that the drop-down support assembly 150 can be incorporated into a pass-through opening of a recreational vehicle. Many RVs include an opening with access doors on opposite sides of the vehicle to allow storage of various items, such as lawn chairs, sports equipment, luggage and even grills. The pass-through opening, such as opening P in FIG. 7, is low on the vehicle, just above the vehicle frame. The support assembly 150' is modified from the assembly 150 described above. For instance, the vertical rod 27 that supports the assembly is mounted deeper inside the pass-through opening P than the prior assembly. The vertical adjustment component 170' is similar to the component 170, except that the component is configured to raise the cooking component 120 upward, rather than downward. The support assembly 150' is thus configured to position the cooking component 120 at a usable height from the lower storage position of the assembly.

The present disclosure should be considered as illustrative and not restrictive in character. It is understood that only certain embodiments have been presented and that all changes, modifications and further applications that come within the spirit of the disclosure are desired to be protected.

What is claimed is:
1. A kitchen accessory for a recreational vehicle comprising:
    a box configured to be mounted within a side wall of the recreational vehicle;
    a vertical support post anchored within said box;

a cooking component including a base and a stove mounted on said base; and a drop-down support assembly mounted on said vertical support post and including a plate on which said base is mounted, said drop-down support assembly configured to extend the cooking component from the box to a deployed position for use outside the vehicle, and to retract the cooking component completely into the box in a stowed position for storage within the box.

2. The kitchen accessory of claim 1, wherein said drop-down support assembly is pivotably mounted on said support post.

3. The kitchen accessory of claim 2, wherein said drop-down support assembly includes an articulating mechanism configured to extend the cooking component outward from the box and to position the cooking component generally horizontal outside the vehicle.

4. The kitchen accessory of claim 3, wherein said articulating mechanism includes:
a first elbow joint rotatably mounted on said vertical support post;
a vertical adjustment component rotatably connected to said first elbow joint; and
a second elbow joint rotatably connected to said vertical adjustment component, said second elbow joint supporting said plate on which said base of the cooking component is mounted.

5. The kitchen accessory of claim 4, wherein said first elbow joint includes an indexing mechanism that limits the first elbow joint to two angular positions relative to the vertical support post, in which one of the angular positions corresponds to the extended position of the cooking component and the other angular position corresponds to the stowed position of the cooking component.

6. The kitchen accessory of claim 4, wherein said first elbow joint includes an indexing mechanism that limits the angular positions of said vertical adjustment component relative to said first elbow joint.

7. The kitchen accessory of claim 4, wherein said second elbow joint includes a limit mechanism that limits the angular rotation of said second elbow joint component relative to said vertical adjustment component to less than 360°.

8. The kitchen accessory of claim 7, wherein said limit mechanism limits said angular rotation to less than 180°.

9. The kitchen accessory of claim 4, wherein the vertical adjustment component includes a pair of parallel arms pivotably mounted between said first and second elbow joints and a gas spring connected between said first elbow joint and one of said pair of parallel arms.

10. The kitchen accessory of claim 9, wherein said vertical adjustment component is configured so that the plate can be positioned vertically below a bottom wall of the box when the cooking component is in the deployed position.

11. The kitchen accessory of claim 1, wherein said cooking component includes a leveling mechanism between said drop-down support assembly and said base of said cooking component, said leveling mechanism configured to horizontally level said base when the cooking component is in the deployed position.

12. The kitchen accessory of claim 11, wherein said leveling mechanism includes a bubble level.

13. The kitchen accessory of claim 1, wherein said cooking component includes a table extension telescopingly mounted to the base so that the table extension can be slid underneath the base for storage or extended outward for use, said table extension including a folding leg assembly at a cantilevered end of said table extension opposite said base of the cooking component, said folding leg assembly configured to support the cantilevered end of the table extension when the table extension is extended outward for use.

14. The kitchen accessory of claim 1, further comprising a table hingedly mounted to said box so that table can pivot between a stowed position inside said box and a deployed position outside said box, said table including a folding leg assembly configured to be folded into said table in said stowed position and to be extended vertically downward from said table in said deployed position to support said table on the ground.

15. The kitchen accessory of claim 1, further comprising an accessory mount rotatably supported on said vertical support post above said drop-down support assembly and including a mount for supporting an accessory thereon.

* * * * *